United States Patent [19]

Albrecht

[11] Patent Number: 5,371,967
[45] Date of Patent: Dec. 13, 1994

[54] ROOT-CONTROL PLANTER THAT IS INTEGRAL, LIGHTWEIGHT, THIN-WALLED, AND COMPACTLY STACKABLE, AND THAT HAS GROUND LOCKS

[75] Inventor: Leonard N. Albrecht, Palm Springs, Calif.

[73] Assignee: Deep Root Partners, L.P., Burlingame, Calif.

[21] Appl. No.: 119,038

[22] Filed: Sep. 9, 1993

[51] Int. Cl.⁵ .................................. A01G 1/08
[52] U.S. Cl. .................................. 47/78; 47/33
[58] Field of Search .................................. 47/73–78, 47/33

[56] References Cited

U.S. PATENT DOCUMENTS

| | | | |
|---|---|---|---|
| 388,154 | 8/1888 | Stanley | 47/26 |
| 4,019,279 | 4/1977 | Moorman et al. | 47/25 |
| 4,179,846 | 12/1979 | Carlisle | 47/59 |
| 4,604,825 | 8/1986 | Mainprice | 47/76 |
| 4,644,685 | 2/1987 | Tisbo | 47/33 |
| 4,665,645 | 5/1987 | Schau, III et al. | 47/25 |
| 4,955,156 | 9/1990 | Williams | 47/25 |
| 5,044,120 | 9/1991 | Couch | 47/79 |
| 5,070,642 | 12/1991 | Albrecht | 47/25 |
| 5,121,569 | 6/1992 | Thomas | 47/33 |

FOREIGN PATENT DOCUMENTS

| | | | |
|---|---|---|---|
| 111444 | 6/1899 | Austria | 47/76 |
| 326797 | 8/1989 | European Pat. Off. | 47/25 |

Primary Examiner—Henry E. Raduazo
Attorney, Agent, or Firm—Richard L. Gausewitz

[57] ABSTRACT

The root-control planter has a thin-walled frustoconical body that is open at the top and bottom, and that has vertically-spaced ledges that lie in planes perpendicular to the axis of the frustum. Internal ribs or ridges are provided integrally with the body, and have vertically-spaced hook or notch portions that hook not only over the top of another identical planter but also over the ledges thereof. At the bottom of the frustum is a radially-outwardly extending flange. At circumferentially spaced points about the bottom region of the body, and adjacent the flange, are relatively small openings through which certain tree roots will grow and lock the planter in the ground despite the upward forces exerted by other tree roots that pass beneath the flange. At the top of the planter body is a continuous rim that is bent-over in an inward direction, hooking or bending over the upper ends of the ribs.

8 Claims, 2 Drawing Sheets

ROOT-CONTROL PLANTER THAT IS INTEGRAL, LIGHTWEIGHT, THIN-WALLED, AND COMPACTLY STACKABLE, AND THAT HAS GROUND LOCKS

BACKGROUND OF THE INVENTION

In U.S. Pat. No. 5,070,642 there are shown and described ground locks to prevent root-control elements from being lifted up in the ground by the tree roots that pass beneath them. It is significant that all of the root-control elements shown and described in that patent are panels, which panels are in some instances used in flat condition and in some instances are combined with other panels to form circular (closed-loop) planters. The planters are used around the root balls of newly planted trees to direct the tree roots downwardly to such depths that nearby sidewalks and other static structures are not cracked or lifted by the roots.

There exist planters that are integral—do not need to be assembled from panels. Because there is no need for any assembly, much labor is saved. However, in no instance known to applicant has any such integral planter incorporated a ground lock. Furthermore, such integral planters were quite thick-walled, heavy, expensive, etc. In addition, such integral planters generally require considerable space while being shipped and stored in stacked condition.

It is easy to injection mold a ground-lock ledge as an integral part of a panel, the ledge being positioned to be engaged by tree roots and thus held down, which in turn holds down the panel. (This is not to imply that conceiving the concept of ground locks—as distinguished from manufacturing them after conception has occurred—was at all easy.) A panel can be injection molded flat, with both sides thereof readily accessible to the mold elements, which means there is no problem in molding ground-lock ledges integrally with the rest of a panel. However, an integral planter is frustoconical or otherwise downwardly divergent, and nobody has previously conceived how ground locks may be incorporated therein.

SUMMARY OF THE INVENTION

There has now been invented an integral root-control planter that has novel ground locks to hold the planter down despite the lifting effects of roots passing beneath it. Such ground locks are simple and economical, and the ground locks together with the entire planter can be injection molded as a single integral structure.

In accordance with another aspect of the invention, the planter is thin-walled and thus lightweight and conserving of synthetic resin, but is nevertheless strong and round as desired.

In accordance with another aspect of the invention, each planter has internal ribs that are shaped to relate not only to the tops of other planters but also to external ledges on other planters. The various relationships are such that more of the present planters can be stacked in a truck compartment of given height than was the case relative to stacked planters previously made by applicant.

In accordance with another aspect of the invention, the ground lock elements are very different from those in the prior art. They are such that those tree roots effecting locking of the planter in the ground are preferably only a short distance above those tree roots passing beneath the planter, whereby to minimize vertical loading of the thin-walled planter body, and whereby all roots are caused to be low in the ground. They include openings, in a predetermined size range, through which some of the tree roots grow.

DETAILED DESCRIPTION OF THE PREFERRED EMBODIMENT

Figure 1:
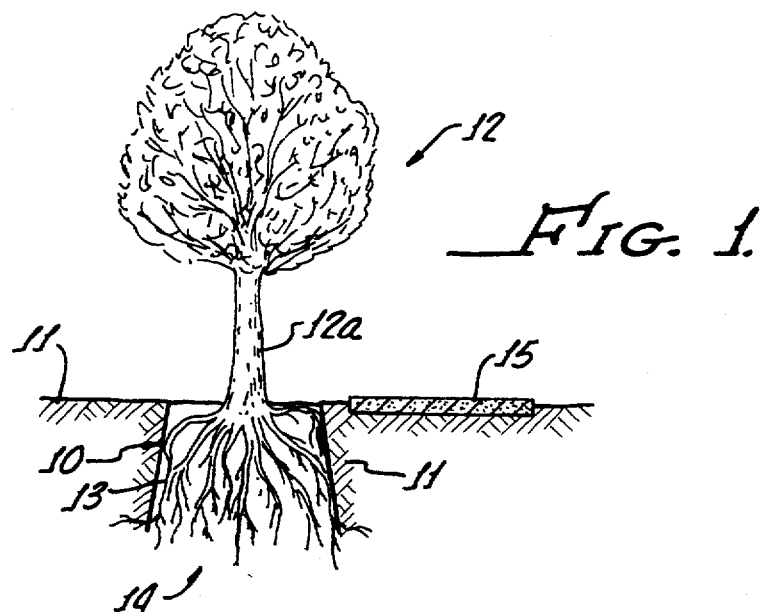
FIG. 1 is a schematic vertical sectional view showing the combination of tree, planter, ground, and sidewalk.

Referring to FIG. 1, the planter of the present invention is indicated generally at 10, and is disposed in the ground or earth 11 around a young tree 12 having a root ball 13. Tree 12 is of a type having roots 14 (FIG. 1) which, upon growing, can crack or lift or otherwise damage adjacent hardscapes or static structures, for example sidewalks, curbs, etc. The illustrated static structure is a concrete sidewalk 15. Tree 12 and planter 10 are disposed sufficiently close to the sidewalk that roots 14 would—in the absence of planter 10—damage such sidewalk.

Typical roots from tree 12 turn outwardly immediately beneath the bottom edge of planter 10, thus gradually exerting on the planter substantial upward forces that tend to lift it despite the downward pressure exerted by ground 11 against the planter. The upward forces exerted by such roots are counteracted by anchoring forces exerted by other roots, so that the root—generated forces substantially neutralize each other and the planter 10 consequently remains substantially stationary in the earth as desired.

Each planter 10 comprises a hollow downwardly-divergent frustoconical body 17 that is thin-walled. The top and bottom of the body 17 are open. Body 17, and the entire planter, are injection molded of a suitable synthetic resin such as polyethylene or polypropylene. The preferred wall thickness of all walls 17a of body 17 is about one-tenth inch. A typical height of body 17 is eighteen inches, while a typical diameter of the lower edge of body 17 is thirty inches.

In accordance with one aspect of the planter, the frustum surface formed by body 17 is not continuous, but has a plurality of external ledges—namely the illustrated upper ledge 18 and lower ledge 19. Stated otherwise, each ledge is a horizontal (radial) surface having a radial dimension of, for example, one-eighth inch. Each ledge is continuous around the full circumference of the body.

The exterior surfaces of the ledges are mirrored by interior surfaces, the relationships being such that the wall thickness of the body 17 remains uniform throughout.

At its upper edge, body 17 is hooked-over. Thus, the upper edge of the body is formed by a continuous inwardly and somewhat downwardly-extending top wall portion 25 a preferred width of which is about five-eighths inch. Portion 25 is integral with a continuous downwardly-extending lip portion 26, which portion also inclines somewhat towards the axis of the body (converges).

At its lower edge, body 17 has a continuous outwardly-extending radial flange 27 a preferred width of which is three-eighths inch, approximately. In this preferred size, the flange thickness is about one-tenth inch.

Ledges 18 and 19, together with top wall portions 25 and 26, and together with flange 27, provide strengthening actions that tend strongly to make each cross-sectional shape of body 17 circular in a horizontal plane, and make the body withstand the pressure of ground therearound, despite the thin wall of the body. Because of the thin wall, the body is lightweight and low in cost.

Ledges 18 and 19 further prevent surface tree roots from escaping over the upper edge of the planter, instead of growing downwardly as desired.

In the above-stated illustration in which the body 17 is eighteen inches high, ledges 18,19 are preferably vertically spaced six inches from each other and—respectively—six inches from the top and bottom of the body.

Figure 6:
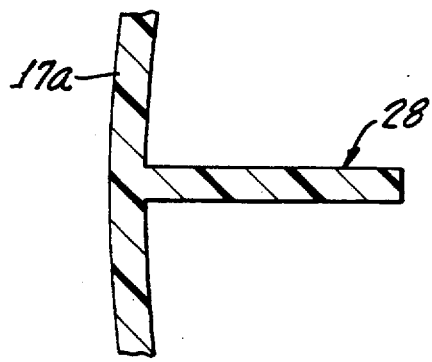
FIG. 6 is a fragmentary horizontal sectional view of any rib or ridge.

Provided in equally circumferentially-spaced relationship around the interior of thin-walled body 17 are a multiplicity of vertical ribs or ridges 28. In the preferred embodiment, there are 14 equally-spaced ribs which are, accordingly, approximately 25 plus degrees from each other. Each rib 28 is integral with body 17, and each is preferably about one-tenth inch thick. Each rib extends from the top to the bottom of the planter. The opposed sidewalls of each rib meet the interior surface portions of body 17 at abrupt angles, preferably 90 degrees as shown in FIG. 6. The radial dimension of each rib is about one-half inch or more, as indicated below.

Besides guiding roots as stated below, the ribs add strength to the thin-walled planter.

Figure 3:
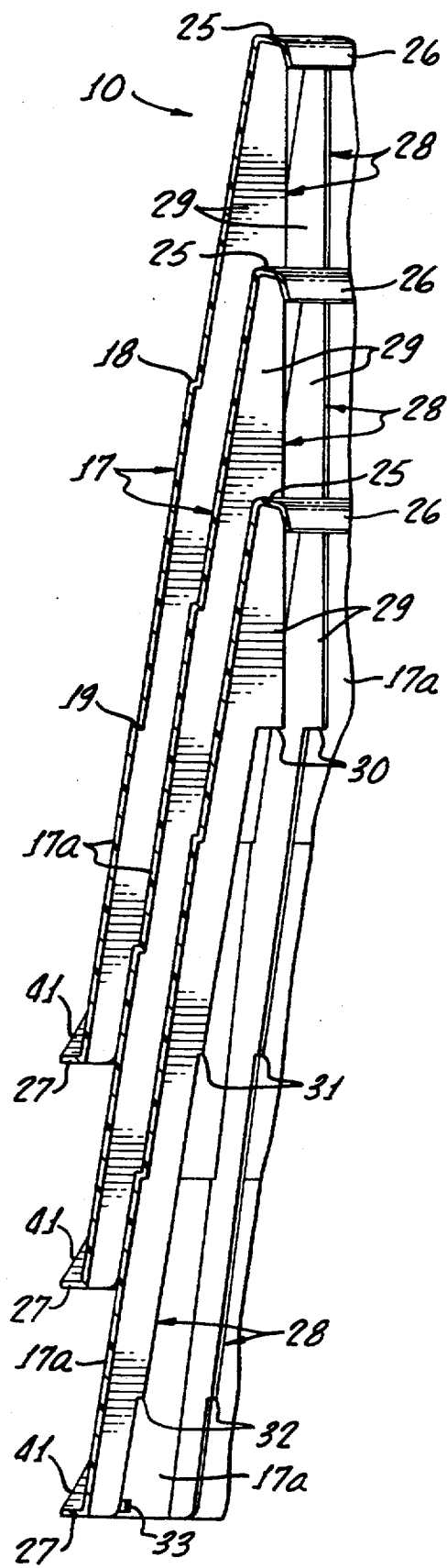
FIG. 3 is a fragmentary vertical sectional view showing the left portions of three identical stacked planters all of which are in the same rotational orientation although this does not normally occur in actual stacking.

As shown at the top left of FIG. 3, the top portion of each rib 28 (all planters and all ribs being identical to each other) is a vertically—elongate triangular portion 29. The upper end of the triangular portion fits integrally in the space defined by wall portions 25,26 of the body. The bottom or base of each triangle is preferably about one inch in radial dimension, with about one-half inch (the outer one) of the bottom being integral with a less-wide portion of each rib therebeneath. The remaining part of the bottom (the inner part) hooks over top wall portion 25 of the planter therebeneath. The hook part that rests on surface 25 is numbered 30.

There are notches or downwardly—facing surfaces 31,32 at a plurality of portions of each rib 28, in spaced relationship from the above-described triangle 29 and in spaced relationship from each other. Notches 31,32 are of such depth and location that they seat, respectively, on ledges 18,19 when the hook portion 30 of each rib is engaged with a radial surface 25 as described above.

Thus, during stacking, there is engagement between the outer and inner nested planters at a plurality of elevations, namely three in the illustrated embodiment. This spreads the load, and is one factor permitting creation of high stacks which may (for example) fill a truck compartment from floor to ceiling.

In the operation of the planter combination as thusfar described, a multiplicity of the identical planters are injection molded. In a typical application, many of the planters are then stacked in individual stacks each of which may include many nested planters. They remain in such stacks during transportation and storage. Then, near the site of a large job, each planter is removed from a stack and associated with a tree 12 and nearby hardscape 15 as shown in FIG. 1. Many roots from root ball 13 grow radially-outwardly until the body 17 is engaged. Then, they typically grow horizontally along the inner surface of body 17. This continues until the nearest rib or ridge 28 is engaged. Because the angle between each ridge and the interior surface of body 17 is sufficiently abrupt, the roots cannot continue in their desired horizontal direction. Accordingly, they typically grow downwardly in the cracks defined by the ribs and by the interior surface of wall 17a of body 17. Typically, they grow down to the bottom edge of body 17, at which point they are free to grow outwardly and do so. However, by this time they are at a sufficiently low depth below the surface of the earth or ground that they do not come sufficiently close to the underside of the sidewalk 15 or other hardscape to crack or raise the hardscape as the roots mature.

It is pointed out that the orientation of the present planter 10 in the earth is such that the upper edge thereof is close to the surface of the earth, preferably flush with such surface, while the bottom edge is sufficiently far beneath the surface that roots growing outwardly therefrom will not damage static structures. The vertical dimension of the planter 10 is at least one foot and preferably about eighteen inches as described.

Immediately after the planter 10 is disposed in the ground, and is filled and surrounded with and by earth, etc. It is difficult to remove the planter because the body 17 thereof diverges downwardly. Furthermore, the flange 27 at its upper surface tends to prevent upward movement of the planter caused by (for example) vandals. The ledges 18,19 at their surfaces further tend to prevent upward movement of the planter caused by vandals.

However, forces created by the radially-outwardly growing roots are eventually distinctly greater than typical forces created by vandals, and would often eventually lift the planter 10 in the ground 11. There will next be described in detail the ground-lock means for preventing or minimizing such lifting, without the necessity for additional ledges with their attendant requirements for material and their substantial impossibility of being injection molded, integrally with the remainder of the planter, in a practical way.

The Ground Locks

Figure 2:
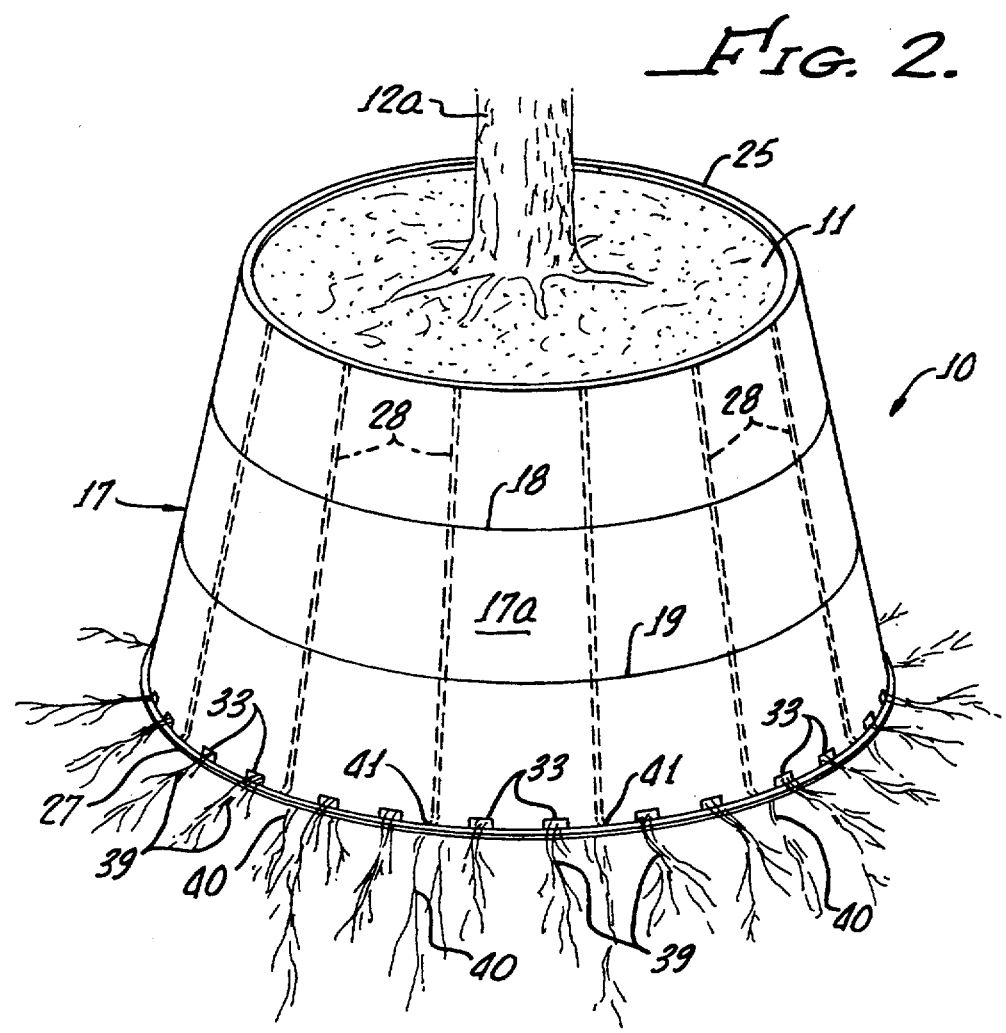
FIG. 2 is an isometric view showing the planter, tree trunk, and growing roots—there is a showing of earth within the planter but a showing of earth around the planter is omitted.
Figure 4:
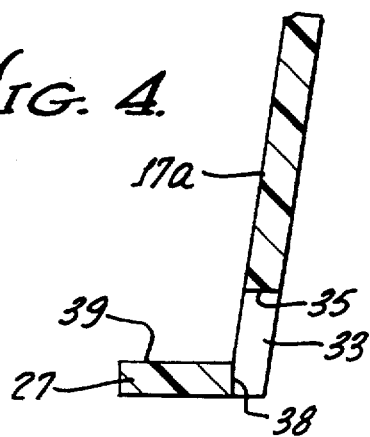
FIG. 4 is an enlarged fragmentary vertical sectional view of one ground lock means.
Figure 5:
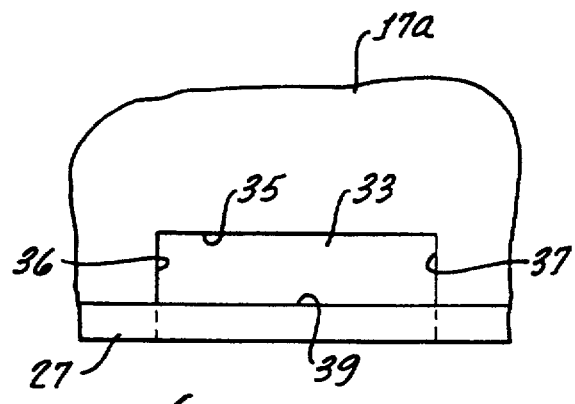
FIG. 5 is a fragmentary elevational view of a ground lock means, as viewed from the left in FIG. 4.

As best shown in FIGS. 2, 4 and 5, a multiplicity of circumferentially-spaced holes or openings 33 are formed in planter body 17 adjacent flange 27. The vertical dimensions of holes 33 are small, being not sufficiently large to freely receive roots from root ball 13 after such roots have matured to a considerable extent. "Freely receive" means growing through the holes without having their upper sides engage the top walls of the holes at the same time that their lower sides engage the bottom walls thereof.

It is pointed out that although many roots from ball 13 grow down the ribs 28 as described above, many others instead grow downwardly in spaced relationship from the ribs. It is these latter roots which applicant prefers to employ as what may be called upper roots, achieving ground locks.

The holes 33 are injection-formed by mold elements that extend immediately adjacent the interior side of radial flange 27. Thus, referring to FIGS. 4 and 5, each hole 33 is defined by a top wall 35, by two sidewalls 36,37, and by an outer wall 38. The outer wall 38 is an inner wall portion of flange 27. Preferably, sidewalls 36,37 are generally vertical but slightly upwardly convergent, whereas top wall 35 is preferably horizontal.

The top surface 39 of flange 27 forms (defines) the bottom wall of each hole 33.

Preferably, the vertical dimension of each hole 33 is less than about one inch, but greater than about one-quarter inch.

In the illustrated embodiment, each hole 33 has a vertical dimension of one-half inch (above the top surface 39 of flange 27). The horizontal dimension of each hole is preferably larger than the vertical dimension thereof, being one inch in the illustrated embodiment.

In the illustrated preferred embodiment, holes 33 are spaced two between adjacent ribs 28, equally spaced from each other and from the ribs 28. It is preferred that the holes not be present immediately at the bottom ends of the ribs.

The operation of the planter combination with the ground-lock means is as follows. A preponderance of the main or more vigorous roots from root ball 13 grow to and down ribs 28 as described above, thereafter turning below the flange 27 and growing outwardly. These may be called the lower roots. Other roots from ball 13 grow downwardly to the holes 33, it being applicant's previous experience and observance that these—the upper roots—are predominantly the lesser roots as distinguished from the main ones. These upper roots grow through the holes 33 as soon as they get down to the top walls 35 thereof. They are very small in diameter, hairlike, when they reach holes 33, and are not impeded in their growth outwardly through the holes.

The majority of roots that grow into holes 33 pass therethrough above flange 27. They then continue to grow outwardly, and gradually enlarge in diameter as they mature. Then, the roots reach sufficient diameters that they stretch the thin wall 17a of body 17, exerting upward pressure on the body portion above the holes and exerting downward pressure on the upper surface 39 of flange 27. The net effect is that the upward and downward forces balance, but the outwardly-extending upper root portions anchor the planter in the earth. Because of the relatively tight fits of the roots in openings 33, there is not substantial play but instead a rather close-working relationship between the anchoring or locking roots and the planter body.

At the same time, the lower roots that pass below flange 27, for example those that pass down the various ribs 28, gradually mature and exert upward forces on the planter. Such upward forces are resisted by the anchoring action achieved by the outwardly-extending upper roots that have passed through holes 33, so that the planter is anchored in the earth as desired. Instead of lifting the planter, the lower roots that are near the planter mature and exert compacting pressure on the earth below them.

It is emphasized that in the preferred embodiment all roots are far down, far below the static structure 15. In FIG. 2, the upper roots are numbered 39 and the lower roots 40.

It is a feature of the invention that the ground-lock means are close to the bottom edge of the planter. This is to be contrasted with prior-art constructions in which ground-lock ridges were illustrated and described as being far above the bottom edges of panels. With the present thin-walled construction, especially, it is not preferred that there be long column loading of the thin wall 17a by ground-lock forces.

Gussets 41 are equally spaced circumferentially above the exterior surface of the planter adjacent flanges 27, and strengthen the flange so that downwardly-acting forces thereon will not tend to bend such flange but instead pull downwardly on body 17 of the planter as desired.

The foregoing detailed description is to be clearly understood as given by way of illustration and example only, the spirit and scope of this invention being limited solely by the appended claims.

What is claimed is:

1. A planter for directing downwardly the roots of a tree, to a depth sufficient that said roots will not damage a nearby static structure, said planter comprising:
    (a) a closed-loop downwardly-divergent synthetic-resin hollow body having an open top and an open bottom,
    (b) upwardly and downwardly-extending ribs or ridges provided on said body in spaced relationship from each other, and
    (c) ground-lock means to maintain said body and ribs anchored in the ground despite lifting effects generated by tree roots growing beneath the bottom edge of said body,
    said ground-lock means comprising openings provided through said body at spaced points therearound,
        said openings having vertical dimensions sufficiently small that tree roots growing therethrough from a tree planted within said body will while maturing engage lower body portions that in part define said openings, whereby portions of said tree roots outside of said body will act as anchors to hold said body down,
        said openings being near the bottom of said body,
        said body having outwardly-extending flange means at the lower edge thereof, portions of said flange means forming said lower body portions.

2. The invention as claimed in claim 1, in which said flange means extends continuously around said body.

3. The invention as claimed in claim 1, in which said planter is disposed in the ground, in which a young tree is planted in the ground and within said planter, and in which a static structure is provided on the ground near said tree and planter.

4. A planter for directing downwardly the roots of a tree, to a depth sufficient that said roots will not damage a nearby static structure, said planter comprising:
    (a) a closed-loop downwardly-divergent synthetic-resin hollow body having an open top and an open bottom,
    (b) upwardly and downwardly-extending ribs or ridges provided on said body in spaced relationship from each other, and
    (c) ground-lock means to maintain said body and ribs anchored in the ground despite lifting effects generated by tree roots growing beneath the bottom edge of said body, said ground-lock means comprising openings provided through said body at spaced points therearound, said openings having vertical dimensions sufficiently small that tree roots growing therethrough from a tree planted within said body will while maturing engage lower body portions that in part define said openings, whereby portions of said tree roots outside of said body will act as anchors to hold said body down, said openings having vertical dimensions of about one-half inch.

5. A planter for directing downwardly the roots of a tree, to a depth sufficient that said roots will not damage a nearby static structure, said planter comprising:

(a) a closed-loop downwardly-divergent synthetic-resin hollow body having an open top and an open bottom, (b) upwardly and downwardly-extending ribs or ridges provided on said body in spaced relationship from each other, and (c) ground-lock means to maintain said body and ribs anchored in the ground despite lifting effects generated by tree roots growing beneath the bottom edge of said body, said ground-lock means comprising openings provided through said body at spaced points therearound, said openings having vertical dimensions sufficiently small that tree roots growing therethrough from a tree planted within said body will while maturing engage lower body portions that in part define said openings, whereby portions of said tree roots outside of said body will act as anchors to hold said body down, said openings having horizontal dimensions of about one inch.

6. A planter for directing downwardly the roots of a tree, to a depth sufficient that said roots will not damage a nearby static structure, said planter comprising:

(a) a closed-loop downwardly-divergent synthetic-resin hollow body having an open top and an open bottom, (b) upwardly and downwardly-extending ribs or ridges provided on said body in spaced relationship from each other, and (c) ground-lock means to maintain said body and ribs anchored in the ground despite lifting effects generated by tree roots growing beneath the bottom edge of said body, said ground-lock means comprising openings provided through said body at spaced points therearound, said openings having vertical dimensions sufficiently small that tree roots growing therethrough from a tree planted within said body will while maturing engage lower body portions that in part define said openings, whereby portions of said tree roots outside of said body will act as anchors to hold said body down, said openings having vertical dimensions of about one-half inch, and having horizontal dimensions of about one inch.

7. A planter for directing downwardly the roots of a tree, to a depth sufficient that said roots will not damage a nearby static structure, said planter comprising:

(a) a closed-loop downwardly-divergent synthetic-resin hollow body having an open top and an open bottom, (b) upwardly and downwardly-extending ribs or ridges provided on said body in spaced relationship from each other, and (c) ground-lock means to maintain said body and ribs anchored in the ground despite lifting effects generated by trees roots growing beneath the bottom edge of said body, said ground-lock means comprising openings provided through said body at spaced points therearound, said openings having vertical dimensions sufficiently small that tree roots growing therethrough from a tree planted within said body will while maturing engage lower body portions that in part define said openings, whereby portions of said tree roots outside of said body will act as anchors to hold said body down, said openings having vertical dimensions of less than about one inch, but greater than about one-quarter inch.

8. A root barrier combination for preventing or minimizing damage to static structures by tree roots, which comprises:

(a) a young tree whose roots can damage a static structure when the tree matures, said tree being planted in the ground, (b) a static structure disposed on the ground and sufficiently close to said tree that said roots can damage said static structure as said tree matures, (c) a synthetic-resin root-barrier element disposed in the ground between said tree and said static structure to protect said static structure from said roots of said tree, said element having generally vertical ridges provided thereon, and (d) ground-lock means provided in said root-barrier element to prevent or minimize lifting of said element by lower tree roots passing therebeneath from said tree, said ground-lock means comprising openings in said root-barrier element and having vertical dimensions sufficiently small that upper tree roots passing therethrough from said tree will engage said root-barrier element on both the top sides of said openings and the bottom sides thereof, some of said upper tree roots being disposed in said openings in said root barrier element and projecting from said openings to act as anchors, said vertical dimensions being less than about one inch.

* * * * *